(12) United States Patent
Yang et al.

(10) Patent No.: US 12,108,135 B2
(45) Date of Patent: *Oct. 1, 2024

(54) CAMERA MODULE

(71) Applicant: Samsung Electro-Mechanics Co., Ltd., Suwon-si (KR)

(72) Inventors: Dong Shin Yang, Suwon-si (KR); Sot Eum Seo, Suwon-si (KR); Ju Sung Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,145

(22) Filed: Jan. 10, 2024

(65) Prior Publication Data

US 2024/0147042 A1 May 2, 2024

Related U.S. Application Data

(63) Continuation of application No. 17/005,960, filed on Aug. 28, 2020, now Pat. No. 11,910,078.

(30) Foreign Application Priority Data

Aug. 30, 2019 (KR) .......................... 10-2019-0107761

(51) Int. Cl.
*G06F 1/16* (2006.01)
*G02B 5/00* (2006.01)
(Continued)

(52) U.S. Cl.
CPC ............. *H04N 23/55* (2023.01); *G02B 5/003* (2013.01); *G06F 1/1686* (2013.01);
(Continued)

(58) Field of Classification Search
CPC ....................................................... H05K 7/00
See application file for complete search history.

(56) References Cited

U.S. PATENT DOCUMENTS 6,078,433 A * 6/2000 Hasenauer ........... G02B 15/144
359/691
10,816,756 B2 10/2020 Lee et al.
(Continued)

FOREIGN PATENT DOCUMENTS

CN 106054494 A 10/2016
CN 108227162 A 6/2018
(Continued)

OTHER PUBLICATIONS

Taiwanese Office Action issued on Jan. 6, 2021, in counterpart Taiwanese Patent Application No. 109129723 (4 pages in English and 4 pages in Mandarin Chinese).
(Continued)

*Primary Examiner* — Jerry Wu
(74) *Attorney, Agent, or Firm* — NSIP Law

(57) ABSTRACT

A camera module includes a first lens module having a first lens barrel accommodating a first lens group, and a second lens module spaced apart from the first lens module in an optical axis direction, configured to be moveable in the optical axis direction, and having a second lens barrel accommodating a second lens group, the first lens barrel includes a first through-hole on one side and a first opening on the other side, the second lens barrel includes a second opening opposing the first opening on one side and a second through-hole on the other side, a diameter of the first opening is greater than a diameter of the first through-hole, and a diameter of the second opening is greater than a
(Continued)

diameter of the second through-hole, and a light shielding member is disposed at one or more of the first opening and the second opening.

12 Claims, 8 Drawing Sheets

(51) Int. Cl.
    *H04M 1/02*           (2006.01)
    *H04N 23/51*         (2023.01)
    *H04N 23/54*         (2023.01)
    *H04N 23/55*         (2023.01)

(52) U.S. Cl.
    CPC .......... *H04M 1/0264* (2013.01); *H04N 23/51* (2023.01); *H04N 23/54* (2023.01)

(56) References Cited

U.S. PATENT DOCUMENTS

| | | |
|---|---|---|
| 2007/0008627 A1 | 1/2007 | Matsumoto et al. |
| 2016/0161702 A1* | 6/2016 | Yang ...................... G02B 7/028 359/503 |
| 2016/0299349 A1 | 10/2016 | Cho |
| 2018/0067379 A1 | 3/2018 | Rho et al. |
| 2018/0164557 A1 | 6/2018 | Sudo et al. |
| 2018/0364450 A1 | 12/2018 | Lee et al. |
| 2021/0067667 A1 | 3/2021 | Yang et al. |

FOREIGN PATENT DOCUMENTS

| | | |
|---|---|---|
| CN | 108627940 A | 10/2018 |
| CN | 109151263 A | 1/2019 |
| CN | 208572216 U | 3/2019 |
| CN | 212905860 U | 4/2021 |
| JP | 2003-177293 A | 6/2003 |
| JP | 2013-88697 A | 5/2013 |
| JP | 2016-90791 A | 5/2016 |
| JP | 6430206 B2 | 11/2018 |
| KR | 10-2018-0137278 A | 12/2018 |

OTHER PUBLICATIONS

Chinese Office Action issued on Aug. 20, 2021, in counterpart Chinese Patent Application No. 202010898237.1 (4 pages in English and 8 pages in Chinese).

Notice of Reasons for Rejection issued on Nov. 12, 2021, in counterpart Korean Patent Application No. 10-2020-0109712 (6 pages in English and 5 pages in Korean).

U.S. Appl. No. 17/005,960, filed Aug. 28, 2020, Yang et al.

Chinese Office Action issued on Mar. 26, 2024, in counterpart Chinese Patent Application No. 202210320033.9 (3 pages in English, 6 pages in Chinese).

* cited by examiner

CAMERA MODULE

CROSS-REFERENCE TO RELATED APPLICATIONS

This application is a continuation of U.S. patent application Ser. No. 17/005,960 filed on Aug. 28, 2020, which claims the benefit under 35 USC 119(a) of Korean Patent Application No. 10-2019-0107761 filed on Aug. 30, 2019, in the Korean Intellectual Property Office, the entire disclosures of which are incorporated herein by reference for all purposes.

BACKGROUND

1. Field

The present disclosure relates to a camera module.

2. Description of the Background

Recently, cameras have been employed in portable electronic devices such as smartphones, tablet personal computers (PCs), laptops, wearables, and the like. A camera for a mobile terminal device may include an autofocusing function (AF), an image stabilization function, such as optical image stabilization (OIS), a zoom function, and the like.

To implement various functions, a structure of a camera module has become complex and a size of a camera module has increased such that a size of a portable electronic device in which a camera module is mounted has also been increased.

Also, to implement an autofocusing function and an optical zoom function, a certain distance should be secured to allow a lens to move in an optical axis direction. However, it may be difficult to implement such a structure due to a reduced thickness of a camera module.

Also, to implement an optical zoom function, a focal length needs to be changed by changing gaps among a plurality of lenses. In this case, however, unnecessary light incident through the gaps among the plurality of lenses may cause a flare.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a first lens module including a first lens barrel accommodating a first lens group, and a second lens module spaced apart from the first lens module in an optical axis direction, configured to be moveable in the optical axis direction, and including a second lens barrel accommodating a second lens group, wherein the first lens barrel includes a first through-hole on one side and a first opening on the other side, wherein the second lens barrel includes a second opening opposing the first opening on one side and a second through-hole on the other side, wherein a diameter of the first opening is greater than a diameter of the first through-hole, and a diameter of the second opening is greater than a diameter of the second through-hole, and wherein a light shielding member is disposed at one or more of the first opening and the second opening.

The light shielding member may be disposed to cover a portion of one or more of the first opening and the second opening.

A surface of the light shielding member may be surface-processed to scatter light.

A light absorbing layer may be disposed on a surface of the light shielding member.

The first lens group and the second lens group may be disposed to oppose each other, and the light shielding member may be disposed on one or more of opposing surfaces of the first lens group and the second lens group.

A stopper may be disposed between the first lens module and the second lens module, and a buffering member having elasticity may be provided in the stopper.

The camera module may further include a reflective module disposed in front of the first lens module, the reflective module may include a reflective member configured to change a path of light incident to the reflective module to be directed to the first lens module.

A first magnet may be disposed in the second lens module, and a first coil may be disposed in a position opposing the first magnet.

The camera module may further include a third lens module spaced apart from the second lens module in the optical axis direction, configured to be moveable in the optical axis direction, and including a third lens barrel accommodating a third lens group, the third lens barrel may include a third through-hole opposing the second through-hole on one side and a third opening on the other side, and a diameter of the third opening may be greater than a diameter of the third through-hole.

The first lens group may have negative refractive power, the second lens group may have positive refractive power, and the third lens group may have negative refractive power.

The first lens group may include a first lens having positive refractive power and a second lens having negative refractive power, the second lens group may include a third lens having positive refractive power, a fourth lens having negative refractive power, and a fifth lens having positive refractive power, and the third lens group may include a sixth lens having positive refractive power and a seventh lens having negative refractive power.

A gap between the first lens module and the second lens module may be smaller than a gap between the second lens module and the third lens module.

The camera module may further include a housing in which the first lens module, the second lens module and the third lens module are accommodated, the first lens module may be fastened to and disposed in the housing, and a ball member may be disposed between the second lens module and the housing and between the third lens module and the housing.

One side surface and the other side surface of each of the second lens module and the third lens module may have different lengths in the optical axis direction.

The first magnet may be disposed on a side surface having a longer length between the one side surface and the other side surface of the second lens module, and the first coil may be disposed in a position opposing the first magnet, and a second magnet may be disposed on a side surface having a longer length between the one side surface and the other side surface of the third lens module, and a second coil may be disposed in a position opposing the second magnet.

The first magnet and the second magnet may be disposed opposite to each other with reference to an optical axis.

A portable electronic device may include a first camera module including the camera module, an image sensor module configured to convert light which passes through the first and second lens modules into an electrical signal, and a second camera module having a different field of view than the first camera module.

The first camera module may have a narrower field of view than the second camera module.

The first camera module may have a field of view within a range of 10° to 25° and the second camera module may have a field of view within a range of 75° to 85°.

In another general aspect, a camera module includes a housing comprising an internal space, a lens module disposed in the internal space, and including lenses disposed in lens barrels, the lenses aligned in an optical axis direction, wherein ends of the lens barrels oppose each other, and a light shielding member disposed in a region between lenses of opposing lens barrels, wherein the light shielding member is disposed on a side of a lens in a lens barrel adjacent an opposing lens barrel on a side of the lens toward the opposing lens barrel.

A first lens barrel may have a first through-hole on one side and a first opening on the other side, a second lens barrel may have a second opening opposing the first opening on one side and a second through-hole on the other side, a diameter of the first opening may be greater than a diameter of the first through-hole, and a diameter of the second opening may be greater than a diameter of the second through-hole, and the light shielding member may be disposed at one or more of the first opening and the second opening.

A third lens barrel spaced apart from the second lens barrel in the optical axis direction may be configured to be moveable in the optical axis direction, the third lens barrel may include a third through-hole opposing the second through-hole on one side and a third opening on the other side, and a diameter of the third opening may be greater than a diameter of the third through-hole.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
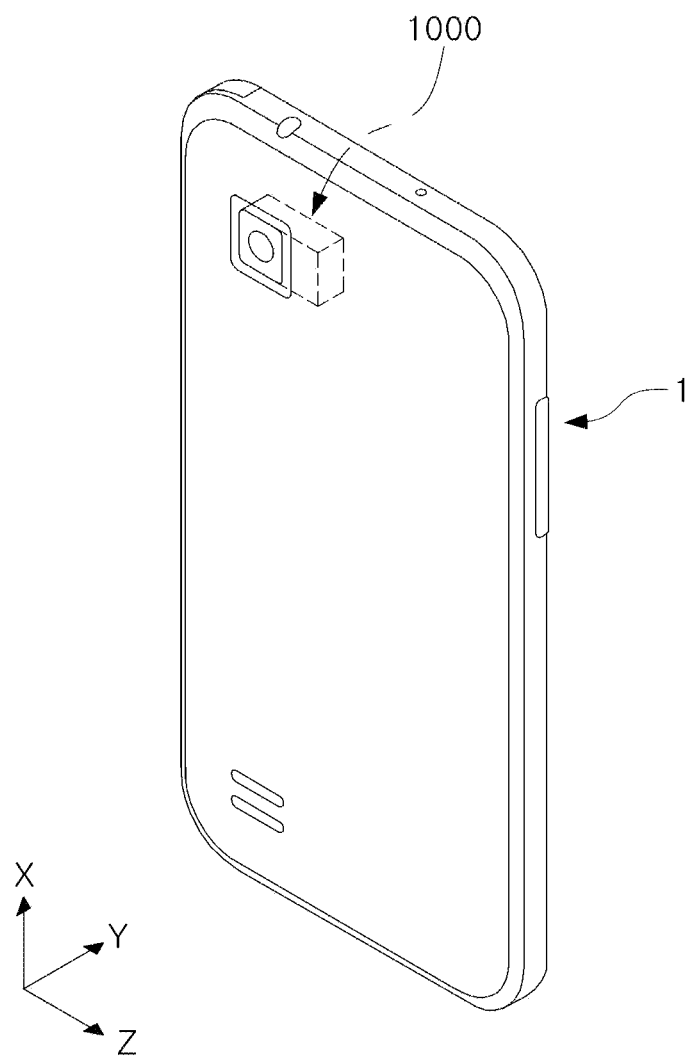
FIG. 1 is a perspective view illustrating a portable electronic device according to an example embodiment of the present disclosure.

Hereinafter, embodiments of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Due to manufacturing techniques and/or tolerances, variations of the shapes shown in the drawings may occur. Thus, the examples described herein are not limited to the specific shapes shown in the drawings, but include changes in shape that occur during manufacturing.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Herein, it is noted that use of the term "may" with respect to an example, for example, as to what an example may include or implement, means that at least one example exists in which such a feature is included or implemented while all examples are not limited thereto.

An aspect of the present disclosure is to provide a camera module which may implement an optical zoom function, may have a simplified structure and a reduced size, and may prevent a flare.

FIG. 1 is a perspective view illustrating a portable electronic device according to an example embodiment.

Referring to FIG. 1, a portable electronic device 1 in the example embodiment may be implemented as a portable electronic device including a camera module 1000 mounted therein, such as a mobile communications terminal device, a smartphone, a tablet PC, a wearable, or the like.

As illustrated in FIG. 1, the camera module 1000 may be mounted in the portable electronic device 1 to image a subject.

In the example embodiment, the camera module 1000 may include a plurality of lenses, and an optical axis (a Z axis) of the lenses may be directed to a direction perpendicular to a thickness direction (a Y axis direction; a direction from a front surface of the portable electronic device to a rear surface, or an opposite direction thereof) of the portable electronic device 1.

As an example, the optical axis (a Z axis) of the plurality of lenses included in the camera module 1000 may be disposed in a width direction or a length direction of the portable electronic device 1.

Accordingly, even when the camera module 1000 includes an autofocusing (AF) function, an optical zoom function, and an optical image stabilization (OIS) function, a thickness of the portable electronic device 1 may not increase. Accordingly, the portable electronic device 1 may have a reduced thickness.

The camera module 1000 in the example embodiment may include an AF function, a zoom function, and an OIS function.

The camera module 1000 including an AF function, a zoom function, and an OIS function may include various components, and accordingly, the camera module 1000 may have an increased size as compared to a general camera module.

When a size of the camera module 1000 increases, it may be difficult to reduce a size of the portable electronic device 1 in which the camera module 1000 is mounted.

For example, a camera module may include a plurality of lens groups to perform a zoom function. When the plurality of lens groups are disposed in a thickness direction of a portable electronic device, a thickness of the portable electronic device may increase according to the number of the lens groups. Accordingly, the number of lens groups may not be sufficiently secured unless a thickness of the portable electronic device increases, which may weaken a zoom function.

Also, to implement an AF function, a zoom function, and an OIS function, an actuator for moving the plurality of lens groups in an optical axis direction or a direction perpendicular to an optical axis should be installed. When the optical axis of the lens groups are formed in a thickness direction of the portable electronic device, however, the actuator for moving the lens groups should be disposed in a thickness direction of the portable electronic device. Accordingly, a thickness of the portable electronic device may increase.

However, in the camera module 1000 in the example embodiment, the optical axis of the plurality of lenses may be disposed to be perpendicular to a thickness direction of the portable electronic device 1. Accordingly, even when the camera module 1000 including an AF function, a zoom function, and an OIS function is mounted, the portable electronic device 1 may have a reduced thickness.

Figure 2:
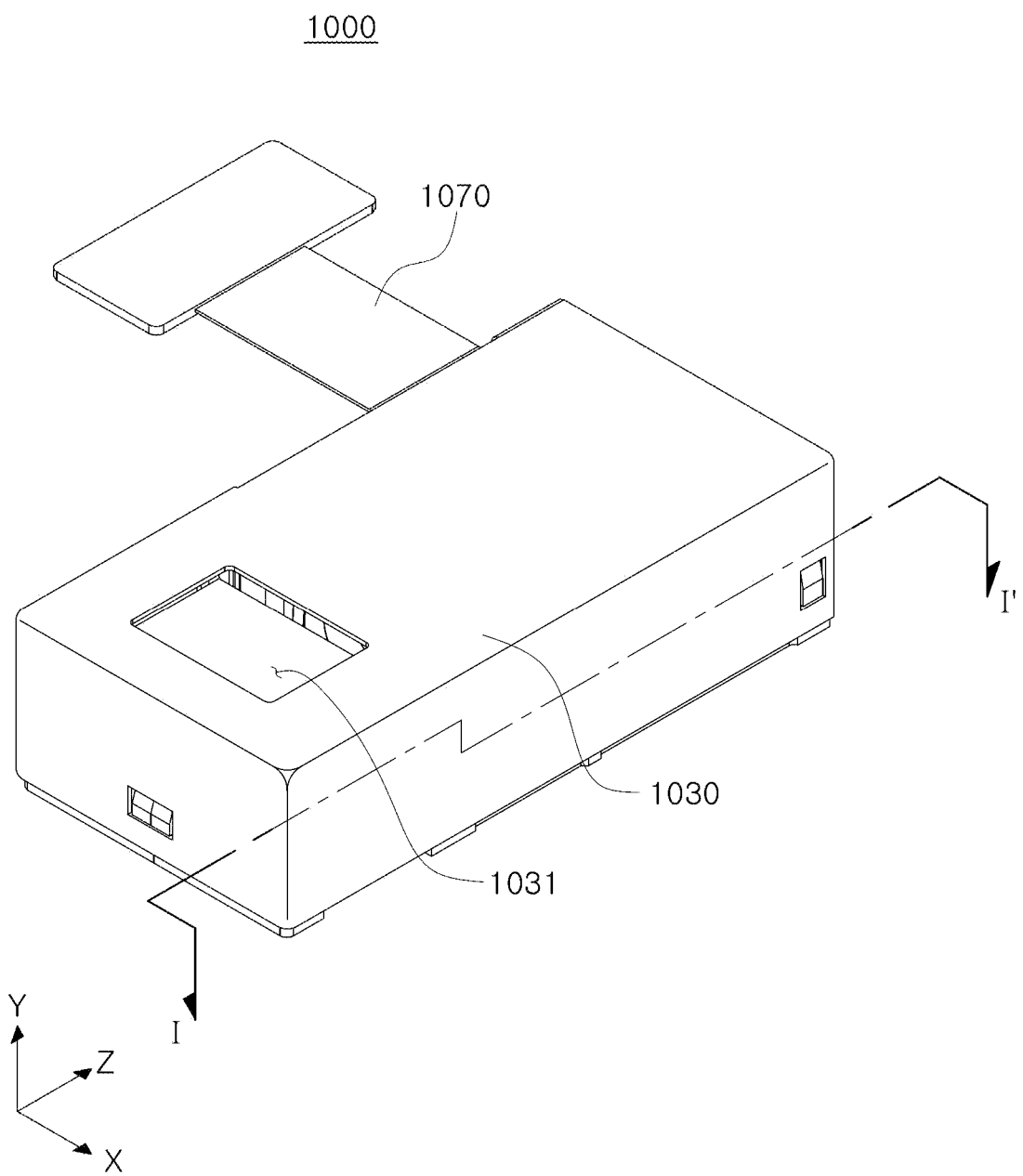
FIG. 2 is a perspective view illustrating a camera module according to an example embodiment of the present disclosure.
Figure 3:
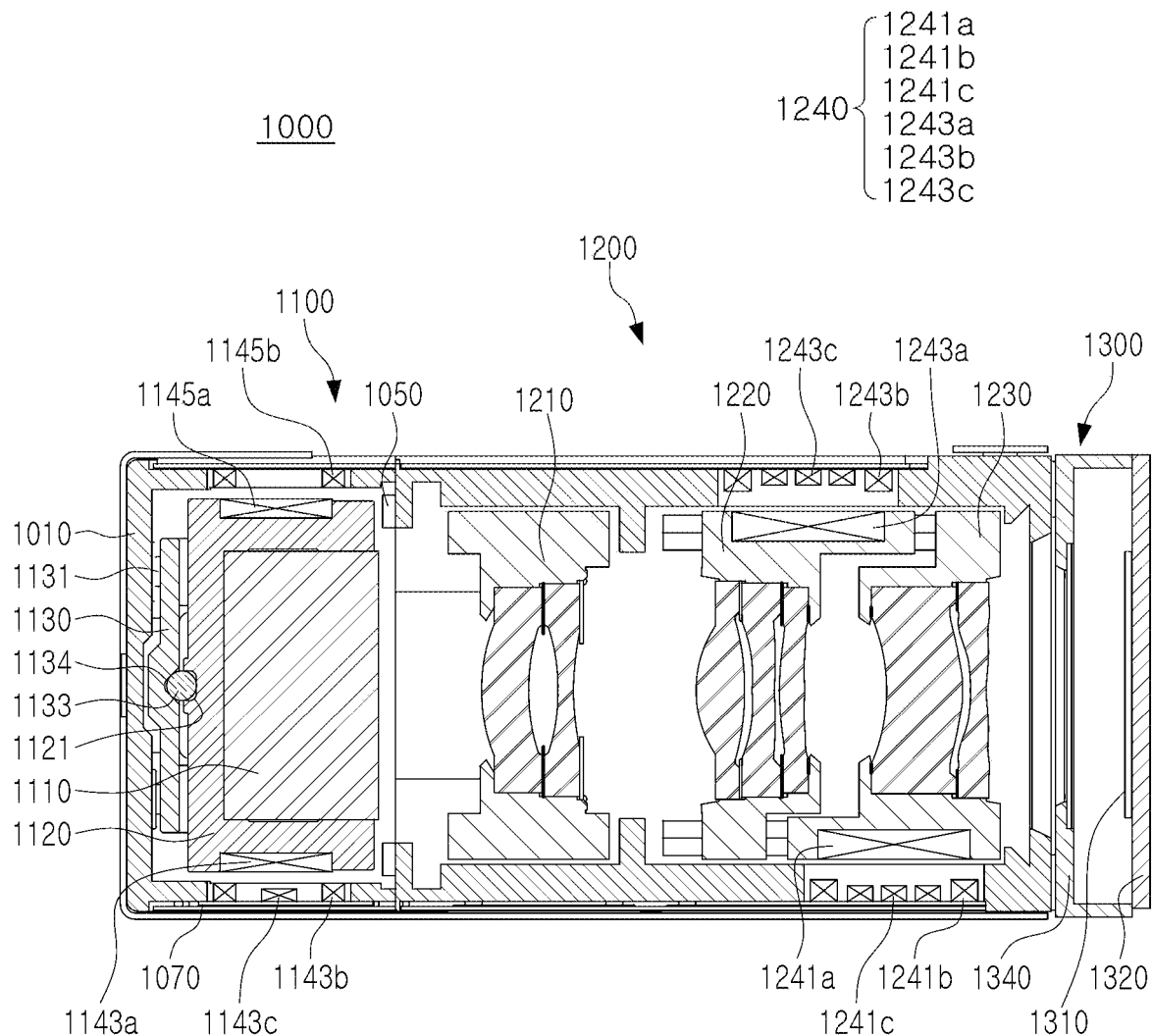
FIG. 3 is a cross-sectional view illustrating a camera module according to an example embodiment of the present disclosure.
Figure 4:
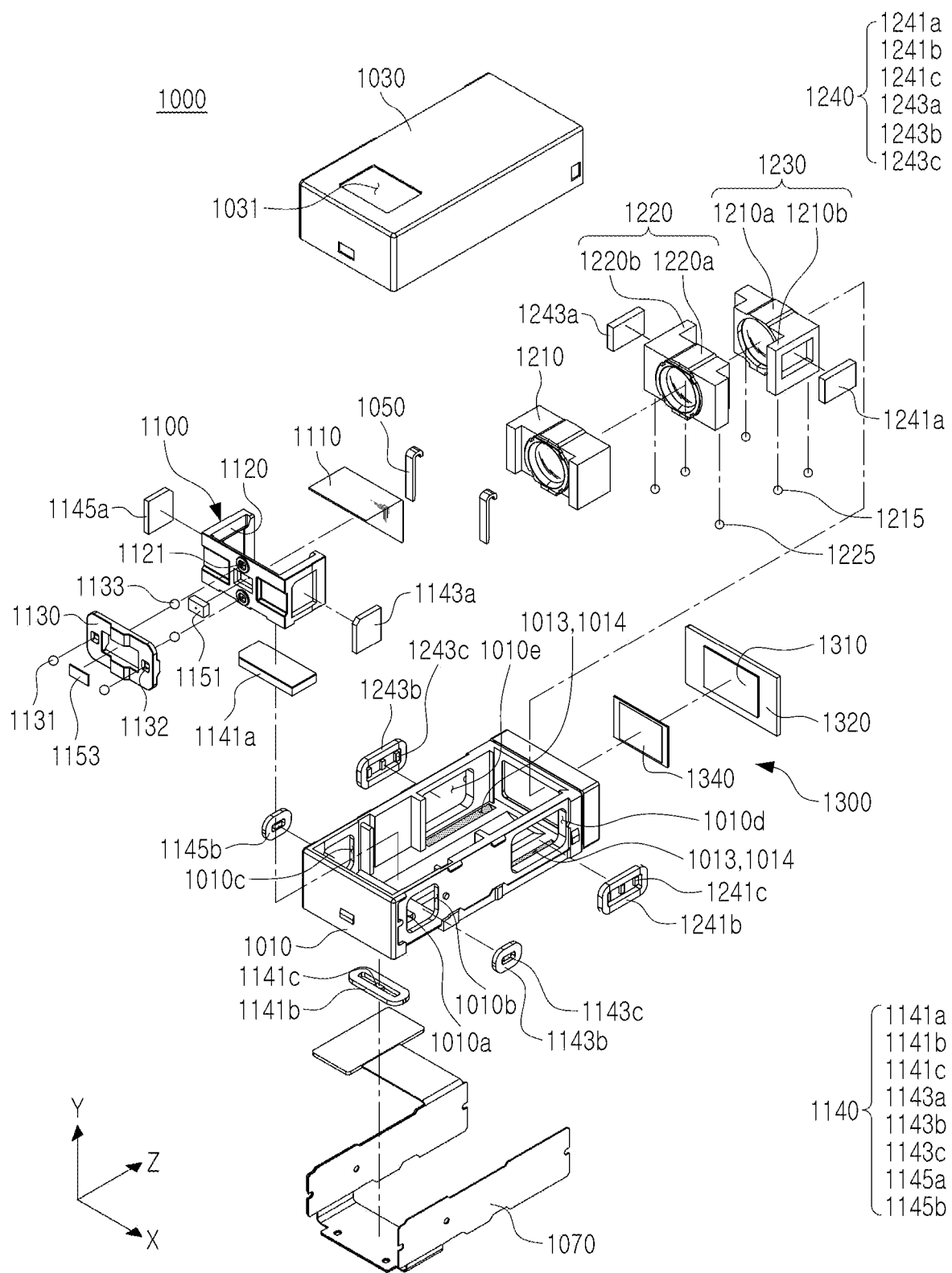
FIG. 4 is an exploded perspective view illustrating a camera module according to an example embodiment of the present disclosure.

FIG. 2 is a perspective view illustrating a camera module according to an example embodiment. FIG. 3 is a cross-sectional view illustrating a camera module according to an example embodiment. FIG. 4 is an exploded perspective view illustrating a camera module according to an example embodiment.

Referring to FIGS. 2 to 4, the camera module 1000 in the example embodiment may include a reflective module 1100, a lens module 1200, and an image sensor module 1300, provided in a housing 1010, The reflective module 1100 may be configured to change a moving direction of light. As an example, a moving direction of light incident through an opening 1031 of a cover 1030 covering the camera module 1000 on an upper portion may change to be directed to the lens module 1200 through the reflective module 1100. To this end, the reflective module 1100 may include a reflective member 1110 for reflecting light.

A path of the light incident in a thickness direction (a Y axis direction) of the camera module 1000 may be changed to substantially match the optical axis (a Z axis) direction by the reflective module 1100.

The lens module 1200 may include a plurality of lenses through which the light having a moving direction changed by the reflective module 1100 passes. Also, the lens module 1200 may include at least three lens modules 1210, 1220, and 1230. An AF function and a zoom function may be implemented by changing gaps among the at least three lens modules 1210, 1220, and 1230.

The image sensor module 1300 may include an image sensor 1310 configured to convert light which passes through the lens module 1200 into an electrical signal, and a printed circuit board 1320 on which the image sensor 1310 is mounted. The image sensor module 1300 may include an optical filter 1340 for filtering incident light which has passed through the lens module 1200. The optical filter 1340 may be implemented by an infrared cut-off filter.

In the internal space of the housing 1010, the reflective module 1100 may be disposed on a front side of the lens module 1200, and the image sensor module 1300 may be disposed on a rear side of the lens module 1200.

Referring to FIGS. 2 to 6, the camera module 1000 in the example embodiment may include a reflective module 1100, a lens module 1200, and an image sensor module 1300, provided in a housing 1010.

In the housing 1010, the reflective module 1100, the lens module 1200, and the image sensor module 1300 may be disposed in order from one side to the other side. The housing 1010 may include an internal space to accommodate the reflective module 1100, the lens module 1200, and the image sensor module 1300. Alternatively, the image sensor module 1300 may be attached to an external side of the housing 1010.

Both of the reflective module 1100 and the lens module 1200 may be disposed in and integrated with the internal space of the housing 1010. However, an example embodiment thereof is not limited thereto. Separate housings for accommodating the reflective module 1100 and the lens module 1200 may also be connected to each other.

The housing 1010 may be covered by a cover 1030 such that the internal space thereof may not be seen from the outside.

The cover 1030 may include an opening 1031 through which light is incident, and a moving direction of light incident through the opening 1031 may be changed by the reflective module 1100 and the light may be incident to the lens module 1200. The cover 1030 may be integrated with the housing 1010 to cover the housing 1010 entirely, or may be divided into separate members for covering the reflective module 1100 and the lens module 1200, respectively.

The reflective module 1100 may include a reflective member 1110 for reflecting light. Also, light which passes through the lens module 1200 may be converted into an electrical signal by the image sensor 1310.

The housing 1010 may include the reflective module 1100 and the lens module 1200 in the internal space thereof. Accordingly, in the internal space of the housing 1010, the space in which the reflective module 1100 is disposed may be distinguished from the space in which the lens module 1200 is disposed by a protruding wall 1007. Also, the reflective module 1100 may be provided on a front side, and the lens module 1200 may be provided on a rear side, with reference to the protruding wall 1007. The protruding wall 1007 may be configured to protrude from both side walls of the housing 1010 into the internal space.

As for the reflective module 1100 provided on a front side, a rotating holder 1120 may be closely in contact with and supported by an internal wall of the housing 1010 by attraction force of a pulling yoke 1153 provided on an internal wall of the housing 1010 and a pulling magnet 1151 provided on the rotating holder 1120. Although not illustrated in the view, the pulling magnet may be provided in the housing 1010 and the pulling yoke may be provided in the rotating holder 1120. Further, the pulling magnet may be provided in the housing 1010 and the rotating holder 1120. The example illustrated in the view will be described for ease of description.

A first ball bearing 1131, a rotating plate 1130, and a second ball bearing 1133 may be provided between an internal wall of the housing 1010 and the rotating holder 1120.

To insert the rotating holder 1120 and the rotating plate 1130 into the internal space of the housing 1010, there may be a space between the rotating holder 1120 and the protruding wall 1007.

After the rotating holder 1120 is mounted on the housing 1010, the rotating holder 1120 may be closely in contact with an internal wall of the housing 1010 by attraction force of the pulling yoke 1153 and the pulling magnet 1151, and the first ball bearing 1131 and the second ball bearing 1133 may be partially inserted into and closely in contact with guide grooves 1132, 1134, 1021, and 1121 such that a space may remain between the rotating holder 1120 and the protruding wall 1007.

Accordingly, a stopper 1050 having a hook shape, which may support the rotating holder 1120 and may be inserted into the protruding wall 1007, may be provided (even when the stopper 1050 is not provided, the rotating holder 1120 may be fastened by attraction force of the pulling magnet 1151 and the pulling yoke 1153). The stopper 1050 may have a hook shape, and a hook portion may oppose the rotating holder 1120 while being caught in an upper portion of the protruding wall 1007.

When the reflective module 1100 is not driven, the stopper 1050 may work as a bracket for supporting the rotating holder 1120, and when the reflective module 1100 is driven, the stopper 1050 may work as a stopper for additionally adjusting the movement of the rotating holder 1120.

The stopper 1050 may be provided on the protruding walls 1007 protruding from both sides. A space may be provided between the stopper 1050 and the rotating holder 1120 to allow the rotating holder 1120 to rotate smoothly. Alternatively, the stopper 1050 may be formed of an elastic material such that the rotating holder 1120 may move smoothly while being supported by the stopper 1050.

A first driving portion 1140 and a second driving portion 1240 for driving the reflective module 1100 and the lens module 1200, respectively, may be provided in the housing 1010. The first driving portion 1140 may include a plurality of coils 1141*b*, 1143*b*, and 1145*b* for driving the reflective module 1100, and the second driving portion 1240 may include a plurality of coils 1241*b* and 1243*b* for driving the lens module 1200 which includes a plurality of lens modules, a first lens module 1210, a second lens module 1220, and a third lens module 1230.

Also, as the plurality of coils 1141*b*, 1143*b*, 1145*b*, 1241*b*, and 1243*b* are provided in the housing 1010 by being mounted on a main substrate 1070, a plurality of through-holes 1010*a*, 1010*b*, 1010*c*, 1010*d*, and 1010*e* may be provided in the housing 1010 such that the plurality of coils 1141*b*, 1143*b*, 1145*b*, 1241*b*, and 1243*b* may be inserted into the through-holes.

The main substrate 1070 on which the plurality of coils 1141*b*, 1143*b*, 1145*b*, 1241*b*, and 1243*b* are mounted may be entirely connected to and integrated with one another as illustrated in the view. In this case, as a single terminal is provided, connection with an external power and a signal may be easily performed. However, an example embodiment thereof is not limited thereto, and the main substrate 1070 may be provided as a plurality of substrates by separating a substrate on which the coils for the reflective module 1100 are mounted from a substrate on which the coils for the lens module 1200 are mounted.

The reflective module 1100 may change a path of light incident through the opening 1031. When an image or a video is obtained, an image or a video may be blurred by the shaking of a user's hand, and in this case, the shaking may be corrected by the reflective module 1100. For example, when the shaking occurs by the shaking of a user's hand when an image or a video is obtained, a relative displacement corresponding to the shaking may be provided to the rotating holder 1120 on which the reflective member 1110 is mounted, thereby correcting the shaking.

Also, in the example embodiment, as an OIS function may be implemented by the movement of the rotating holder 1120, which is light-weighted as the rotating holder 1120 does not include a lens, or the like, power consumption may be reduced.

In other words, in the example embodiment, to implement an optical image stabilization (OIS) function, a moving direction of light may change by moving the rotating holder 1120 on which the reflective member 1110 is provided, rather than by moving the lens module or the image sensor on which the plurality of lenses are provided.

The reflective module 1100 may include a rotating holder 1020 supported by the housing 1010, the reflective member 1110 mounted on the rotating holder 1020, and a first driving portion 1140 for moving the rotating holder 1120.

The reflective member 1110 may change a moving direction of light. The reflective member 1110 may be implemented by a mirror or a prism which may reflect light (in the example illustrated in the view, the reflective member 1110 may be implemented by a prism for ease of description).

The reflective member 1110 may be fixed to the rotating holder 1120. The rotating holder 1120 may include a mounting surface 1123 on which the reflective member 1110 is mounted.

The mounting surface 1123 of the rotating holder 1120 may be configured as an inclined surface to change a path of light. As an example, the mounting surface 1123 may be an inclined surface, inclined by 30 to 60 degrees with respect to an optical axis (a Z axis) of the lens module 1200. Also, the inclined surface of the rotating holder 1120 may be directed to the opening 1031 of the cover 1030 to which light is incident.

The rotating holder 1120 on which the reflective member 1110 is mounted may be moveably accommodated in the internal space of the housing 1010. For example, the rotating holder 1120 may be rotatably accommodated with reference to a first axis (an X axis) and a second axis (a Y axis) in the housing 1010. The first axis (an X axis) and the second axis (a Y axis) may be perpendicular to the optical axis (a Z axis), and the first axis (an X axis) and the second axis (a Y axis) may be perpendicular to each other.

The rotating holder 1120 may be supported by the housing 1010 through a first ball bearing 1131 arranged along the first axis (an X axis) and a second ball bearing 1133 arranged along the second axis (a Y axis) to smoothly move with reference to the first axis (an X axis) and the second axis (a Y axis). In the example illustrated in the view, two first ball bearings 1131 aligned along the first axis (an X axis) and two second ball bearings 1133 aligned along the second axis (a Y axis) may be provided. Also, the rotating holder 1120 may rotate with reference to the first axis (an X axis) and the second axis (a Y axis) by the first driving portion 1140.

Each of the two first ball bearings 1131 aligned along the first axis (an X axis) may have a cylindrical shape extending in the first axis (an X axis), and each of the two second ball bearings 1133 aligned along the second axis (a Y axis) may have a cylindrical shape extending in the second axis (a Y axis). In this case, each of guide grooves 1021, 1121, 1132, and 1134 may have a semi-cylindrical shape to correspond to the shapes of the first and second ball bearings 1131 and 1133.

The first ball bearing 1131 and the second ball bearing 1133 may be provided on a front surface and a rear surface of a rotating plate 1130, respectively (alternatively, positions of the first ball bearing 1131 and the second ball bearing 1133 may be changed and the first ball bearing 1131 and the second ball bearing 1133 may be provided on a rear surface and a front surface of a rotating plate 1130, respectively. In other words, the first ball bearings 1131 may be aligned along the second axis (a Y axis) and the second ball bearings 1133 may be aligned along the first axis (an X axis). In the description below, the example embodiment illustrated in the view will be described for ease of description), and the rotating plate 1130 may be provided between internal side surfaces of the rotating holder 1120 and the housing 1010.

The rotating holder 1120 may be supported by the housing 1010 by means of the rotating plate 1130 through attractive force of the pulling magnet 1151, or a pulling yoke, provided on the rotating holder 1120, and the pulling yoke 1153, or a pulling magnet, provided in the housing 1010. The first ball bearing 1131 and the second ball bearing 1133 may also be provided between the rotating holder 1120 and the housing 1010.

The guide grooves 1132 and 1134 may be provided on a front surface and a rear surface of the rotating plate 1130 for the first ball bearing 1131 and the second ball bearing 1133 to be inserted into the guide grooves 1132 and 1134, respectively, and the guide grooves 1132 and 1134 may include a first guide groove 1132 to which a portion of the first ball bearing 1131 is inserted and a second guide groove 1134 to which a portion of the second ball bearing 1133 is inserted.

Also, a third guide groove 1021 may be provided in the housing 1010 to allow a portion of the first ball bearing 1131 to be inserted, and a fourth guide groove 1121 may be provided in the rotating holder 1120 to allow a portion of the second ball bearing 1133 to be inserted.

Each of the first guide groove 1132, the second guide groove 1134, the third guide groove 1021, and the fourth guide groove 1121 may have a semi-circular or a polygonal (a polyprism or a polypyramid) shape to allow the first ball bearing 1131 and the second ball bearing 1133 to smoothly rotate.

The first ball bearing 1131 and the second ball bearing 1133 may work as bearings by rolling or sliding in the first guide groove 1132, the second guide groove 1134, the third guide groove 1021, and the fourth guide groove 1121.

The first ball bearing 1131 and the second ball bearing 1133 may be configured to be fixed to at least one of the housing 1010, the rotating plate 1130, and the rotating holder 1120. For example, the first ball bearing 1131 may be fixed to the housing 1010 or the rotating plate 1130, and the second ball bearing 1133 may be fixed to the rotating plate 1130 or the rotating holder 1120.

In this case, the guide groove may only be provided in the member opposing the member to which the first ball bearing 1131 or the second ball bearing 1133 is fastened, and in this case, the ball bearings may work as friction bearings by sliding, rather than by rotating.

In the case in which the first ball bearing 1131 and the second ball bearing 1133 are configured to be fixed to one of the housing 1010, the rotating plate 1130, and the rotating holder 1120, each of the first ball bearing 1131 and the second ball bearing 1133 may be configured to have a circular shape, a semi-circular shape, a rounded projection shape, or the like.

Also, the first ball bearing 1131 and the second ball bearing 1133, separately manufactured, may be attached to one of the housing 1010, the rotating plate 1130, and the rotating holder 1120. Alternatively, the first ball bearing 1131, the second ball bearing 1133, the housing 1010, the rotating plate 1130, and the rotating holder 1120 may be configured to be integrated with one another.

The first driving portion 1140 may generate a driving force to allow the rotating holder 1120 to rotate with reference to two axes.

As an example, the first driving portion 1140 may include a plurality of magnets 1141a, 1143a, and 1145a and a plurality of coils 1141b, 1143b, and 1145b opposing the plurality of magnets 1141a, 1143a, and 1145a.

When power is applied to the plurality of coils 1141b, 1143b, and 1145b, the rotating holder 1120 on which the plurality of magnets 1141a, 1143a, and 1145a are mounted may rotate with reference to the first axis (an X axis) and the second axis (a Y axis) by electromagnetic force between the plurality of magnets 1141a, 1143a, and 1145a and the plurality of coils 1141b, 1143b, and 1145b.

The plurality of magnets 1141a, 1143a, and 1145a may be mounted on the rotating holder 1120. As an example, a portion 1141a of the plurality of magnets 1141a, 1143a, and 1145a may be mounted on a lower surface of the rotating holder 1120, and the others 1143a and 1145a may be mounted on a side surface of the rotating holder 1120.

The plurality of coils 1141b, 1143b, and 1145b may be mounted on the housing 1010. As an example, the plurality of coils 1141b, 1143b, and 1145b may be mounted on the housing 1010 by the main substrate 1070. The plurality of coils 1141b, 1143b, and 1145b may be mounted on the main substrate 1070, and the main substrate 1070 may be mounted on the housing 1010.

In the example illustrated in the view, the main substrate 1070 may be provided in an integrated form in which both the coil for the reflective member 1110 and the coil for the lens module 1200 are provided on the main substrate 1070, but an example embodiment thereof is not limited thereto. The main substrate 1070 may be divided into two or more substrates for the coil for the reflective member 1110 and the coil for the lens module 1200 to be separately mounted.

In the example embodiment, a closed-loop control method of sensing a position of the rotation holder 1120 and providing a feedback of the sensing when the rotation holder 1120 rotates may be used.

Accordingly, to perform the closed-loop control, position sensors 1141c and 1143c may be provided. The position sensors 1141c and 1143c may be implemented by hall-sensors.

The position sensors 1141c and 1143c may be disposed on internal sides or external sides of the coils 1141b and 1143b, and the position sensors 1141c may be mounted on the main substrate 1070 on which the coils 1141b and 1143b are mounted.

A gyro sensor (not illustrated) for sensing a factor of shaking, such as the shaking of a user's hand, may be provided on the main substrate 1070, and a driving circuit device (a driver IC; not illustrated) for providing a driving signal to the plurality of coils 1141b, 1143b, and 1145b may be provided on the main substrate 1070.

When the rotating holder 1120 rotates with reference to the first axis (an X axis), the rotating plate 1130 and the rotating holder 1120 may rotate together while being supported by the first ball bearing 1131 arranged along the first axis (an X axis) (in this case, the rotating holder 1120 may not relatively move with respect to the rotating plate 1130).

Also, when the rotating holder 1120 rotates with reference to the second axis (a Y axis), the rotating holder 1120 may rotate while being supported by the second ball bearing 1133 arranged along the second axis (a Y axis) (in this case, as the rotating plate 1130 does not rotate, the rotating holder 1120 may relatively rotate with respect to the rotating plate 1130).

When the rotating holder 1120 rotates with reference to the first axis (an X axis), the first ball bearing 1131 may work, and when the rotating holder 1120 rotates with reference to the second axis (a Y axis), the second ball bearing 1133 may work. That is because, as illustrated in the view, when the rotating holder 1120 rotates with reference to the first axis (an X axis), the second ball bearing 1133 arranged along the second axis (a Y axis) may not move while being inserted into the guide groove, and when the rotating holder 1120 rotates with reference to the second axis (a Y axis), the first ball bearing 1131 arranged with reference to the first axis (an X axis) may not move while being inserted into the guide groove.

Light reflected from the reflective member 1110 may be incident to the lens module 1200.

Figure 5:
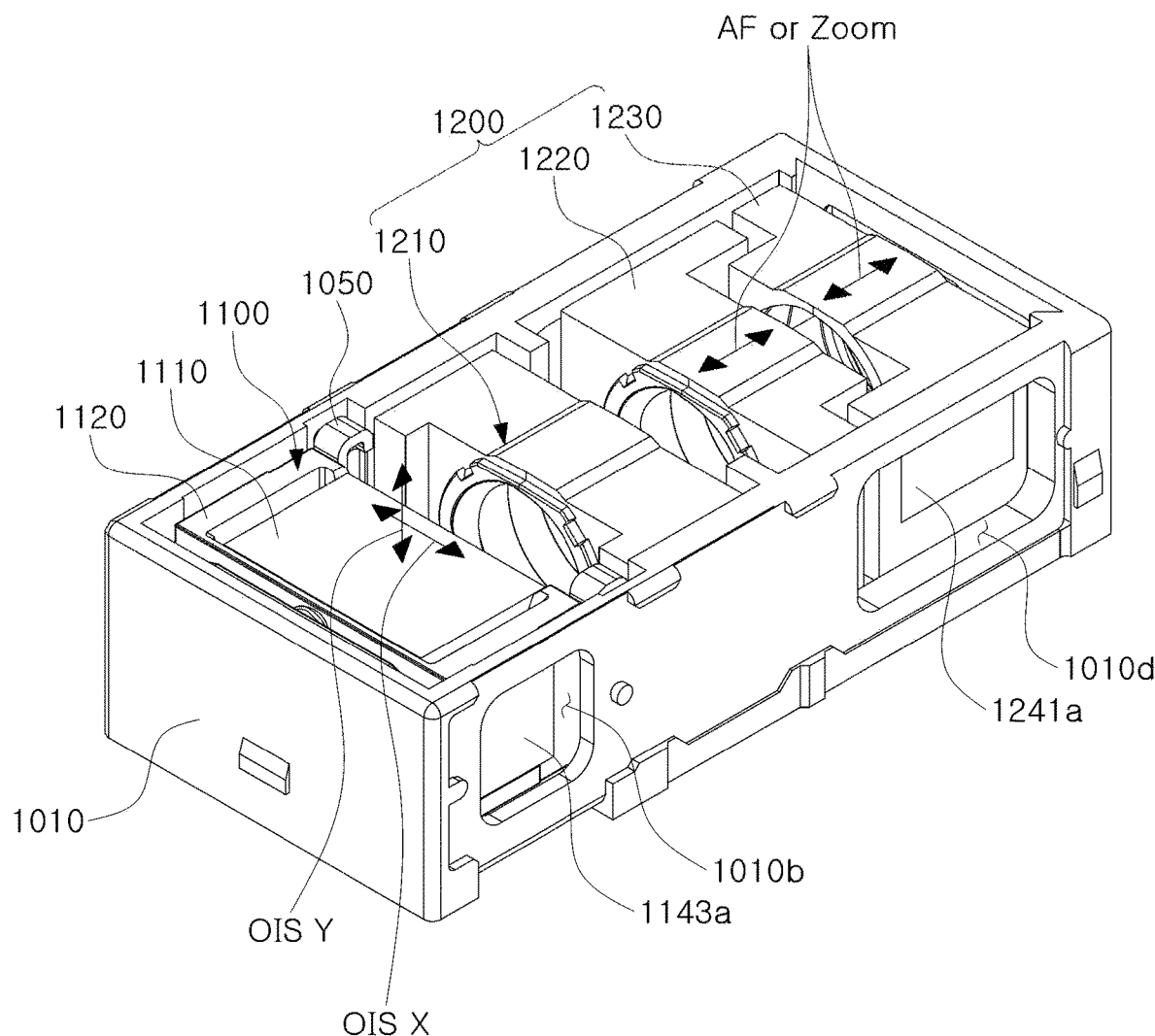
FIG. 5 is a perspective view illustrating an example in which a lens module is combined with a housing of a camera module according to an example embodiment of the present disclosure.

Referring to FIG. 5, one of the three lens modules 1210, 1220, and 1230 may maintain a state of being fixed to the housing 1010, and the other two lens modules may perform a zoom function and an autofocusing function, respectively, or both the two lens modules may perform the same function. For example, the two lens modules 1220 and 1230 disposed on a rear side may perform a zoom function and an autofocusing function, respectively, or both the two lens modules may perform the same function, which is, for example, both the two lens modules 1220 and 1230 disposed on a rear side may perform a zoom function, and the lens module 1230 disposed the most farthest may additionally perform an autofocusing function, and the single lens module 1210 disposed on a front side may maintain a state of being fixed to the housing 1010.

The plurality of lenses provided in the lens module 1200 may be separately provided in the three lens modules 1210, 1220, and 1230.

The lens module 1200 may include a second driving portion 1240 to implement an AF function and a zoom function.

The lens module 1200 may include a first lens module 1210, a second lens module 1220, and a third lens module 1230. The first lens module 1210 may be fixed to the housing 1010, and the second and third lens modules 1220 and 1230 may be disposed in the housing 1010 to move in the optical axis (a Z axis) direction. Also, the second driving portion 1240 for changing gaps among the first to third lens modules 1210, 1220, and 1230 may be included.

Gaps among the first to third lens modules 1210, 1220, and 1230 may change to implement an AF function or a zoom function.

Accordingly, the second driving portion 1240 may generate a driving force to change the gaps among the first to third lens modules 1210, 1220, and 1230. As an example, the second driving portion 1240 may separately move the second and third lens modules 1220 and 1230 in the optical axis (a Z axis) direction and may implement an AF function and/or a zoom function.

The first to third lens modules 1210, 1220, and 1230 may be supported by a bottom surface of the housing 1010. For example, the first lens module 1210 may be fixed to and supported by the bottom surface of the housing 1010, and the second and third lens modules 1220 and 1230 may be supported by the bottom surface of the housing 1010 by the ball bearing.

A stopper 1009 protruding from both side walls of the housing 1010 to the internal space of the housing 1010 may be provided to prevent collision between the second lens module 1220 and the first lens module 1210 when the second lens module 1220 moves in the optical axis direction.

The stopper 1009 may prevent the second lens module 1220 from colliding with the first lens module 1210 by limiting a moving range of the second lens module 1220 towards a front (a direction of the first lens module 1210).

The stopper 1009 may include a buffering member having elasticity to absorb impact. Accordingly, when the second lens module 1220 collides with the stopper 1009, impact and noise applied to the second lens module 1220 may be absorbed.

The second driving portion 1240 may include a plurality of magnets 1241a and 1243a, and a plurality of coils 1241b and 1243b opposing the plurality of magnets 1241a and 1243a.

When power is applied to the plurality of coils 1241b and 1243b, the plurality of magnets 1241a and 1243a may move the separately mounted second and third lens modules 1220 and 1230 in the optical axis (a Z axis) direction by electromagnetic force between the plurality of magnets 1241a and 1243a and the plurality of coils 1241b and 1243b.

The plurality of magnets 1241a and 1243a may be separately mounted on the second and third lens modules 1220 and 1230. As an example, the first magnet 1243a may be mounted on a side surface of the second lens module 1220, and the second magnet 1241a may be mounted on a side surface of the third lens module 1230.

The plurality of coils 1241b and 1243b may be mounted in the housing 1010 to oppose the plurality of magnets 1241a and 1243a, respectively. As an example, the plurality of coils 1241b and 1243b may be mounted on the main substrate 1070, and the main substrate 1070 may be mounted in the housing 1010.

As the plurality of magnets 1241a and 1243a may be provided on opposite sides with reference to the second and third lens modules 1220 and 1230, respectively, the plurality of coils 1241b and 1243b may also be separately provided on both side walls of the housing 1010, respectively.

In the example embodiment, a closed-loop control method of sensing positions of the second and third lens modules 1220 and 1230 and providing a feedback of the sensing when the second and third lens modules 1220 and 1230 move may be used. Accordingly, to perform the closed-loop control, position sensors 1241c and 1243c may be necessary. The position sensors 1241c and 1243c may be implemented by hall-sensors.

The position sensors 1241c and 1243c may be disposed on internal sides or external sides of the coils 1241b and 1243b, and the position sensors 1241c and 1243c may be mounted on the main substrate 1070 on which the coils 1241b and 1243b are mounted.

The second lens module 1220 and the third lens module 1230 may be driven by a pair of coils and magnets, and in this case, the coils and magnets may be provided on one side with reference to the second and third lens modules 1220 and 1230. In this case, sizes of the coils and magnets may be increased to strengthen driving force, and accordingly, the plurality of position sensors 1241c and 1243c may be provided to accurately sense positions. In the example illustrated in the view, three position sensors 1241c and 1243c may be provided in each of the coils 1241b and 1243b which drive the second lens module 1220 and the third lens module 1230.

The third lens module 1230 may be provided in the housing 1010 to move in the optical axis (a Z axis) direction. As an example, a third ball bearing 1215 may be disposed between the third lens module 1230 and a bottom surface of the housing 1010.

The third ball bearing 1215 may guide the movement of the third lens module 1230 in the process of implementing an AF function and a zoom function.

The third ball bearing 1215 may be configured to roll in optical axis (a Z axis) direction when a driving force for moving the third lens module 1230 in the optical axis (a Z axis) direction is generated. Accordingly, the third ball bearing 1215 may guide the movement of the third lens module 1230 in the optical axis (a Z axis) direction.

Guide grooves 1214 and 1013 for accommodating the third ball bearing 1215 may be disposed on surfaces of the third lens module 1230 and the housing 1010 opposing each other, and the guide groove 1013 disposed in the housing 1010 may be elongated in the optical axis (a Z axis) direction.

The third ball bearing 1215 may be accommodated in the guide grooves 1214 and 1013 and may be inserted to a region between the third lens module 1230 and the housing 1010.

One or both of the guide grooves 1214 and 1013 may be elongated in the optical axis (a Z axis) direction. A cross-sectional surface of each of the guide grooves 1214 and 1013 may have various shapes, such as a rounded shape, a polygonal shape, or the like.

The third lens module 1230 may be pressured towards a bottom of the housing 1010 such that the third ball bearing 1215 may maintain a state of being in contact with the third lens module 1230 and the housing 1010. To this end, a pulling yoke 1016 may be mounted on a bottom surface of the housing 1010 to oppose a pulling magnet 1216 mounted on a lower surface of the third lens module 1230. The pulling yoke 1016 may be implemented by a magnetic material. Alternatively, the pulling magnet may be mounted on a bottom surface of the housing 1010, and the pulling yoke may be mounted on the bottom surface of the third lens module 1230.

The coil 1241b for driving the third lens module 1230 may be provided on one side surface of both side surfaces of the housing 1010. In this case, as electromagnetic force may be applied to only one side surface of the third lens module 1230, the pulling magnet 1216 and the pulling yoke 1016 may be disposed adjacent to one side surface from a center of the housing 1010 to accurately move the third lens module 1230. Also, to increase driving force, a portion of the third lens module 1230 on which a magnet 1241a is mounted may extend towards the second lens module 1220 in an optical axis direction to increase a size of the magnet.

Further, to increase driving force, a portion of the second lens module 1220 on which a magnet 1243a is mounted may extend towards the third lens module 1230 in the optical axis direction to increase a size of the magnet.

A coil 1243b for driving the second lens module 1220 may be provided on the other side surface of the housing 1010, opposing one side surface, between both side surfaces, and in this case, electromagnetic force may be applied to the other side surface of the second lens module 1220. Accordingly, the pulling magnet 1226 and the pulling yoke 1017 may be disposed adjacent to the one side surface from a center of the housing 1010 to accurately move the second lens module 1220.

The second lens module 1220 may be provided in the housing 1010 to move in the optical axis (a Z axis) direction. As an example, the second lens module 1220 may be disposed on a front side of the third lens module 1230.

A fourth ball bearing 1225 may be provided between the second lens module 1220 and a bottom surface of the housing 1010, and the second lens module 1220 may slide or roll with respect to the housing 1010 by the fourth ball bearing 1225.

The fourth ball bearing 1225 may support the rolling or the sliding of the second lens module 1220 in the optical axis (a Z axis) direction when a driving force for moving the second lens module 1220 in the optical axis (a Z axis) direction is generated.

Guide grooves 1224 and 1014 for accommodating the fourth ball bearing 1225 may be disposed on opposite surfaces of the second lens module 1220 and the housing 1010, and the guide groove 1014 disposed in the housing 1010 may be elongated in the optical axis (a Z axis) direction.

The fourth ball bearing 1225 may be accommodated in the guide grooves 1224 and 1014 may be inserted between the second lens module 1220 and the housing 1010.

Each of the guide grooves 1224 and 1014 may be elongated in the optical axis (a Z axis) direction. A cross-sectional surface of each of the plurality of guide grooves 1224 and 1014 may have various shapes such as a rounded shape, a polygonal shape, or the like.

The guide grooves 1013 and 1014 provided in the housing 1010 may have an elongated groove shape extending in the optical axis direction, or may be connected to each other. When the guide grooves 1013 and 1014 are configured to be connected to each other, the second and third lens modules 1220 and 1230 may be easily aligned in the optical axis direction.

The second lens module 1220 may be pressured towards a bottom surface of the housing 1010 such that the fourth ball bearing 1225 may maintain a state of being in contact with the second lens module 1220 and the housing 1010.

To this end, a pulling yoke 1017 may be mounted on the bottom surface of the housing 1010 to oppose a pulling magnet 1226 mounted on the second lens module 1220. The pulling yoke 1016 may be implemented by a magnetic material. Alternatively, the pulling magnet may be mounted on the bottom surface of the housing 1010 and the pulling yoke may be mounted on the lower surface of the second lens module 1220.

The second lens module 1220 may include a first lens seating portion 1220a in which a plurality of lenses are disposed, and a first extending portion 1220b extending from the first lens seating portion 1220a. The first extending portion 1220b may extend from one side of the first lens seating portion 1220a towards the third lens module 1230 in the optical axis direction.

Accordingly, a length of one side of the second lens module 1220 may be greater than a length of the other side opposing the one side. The length may refer to a length in the optical axis direction. Accordingly, the second lens module 1220 may have a shape in which one side and the other side are asymmetrical to each other with reference to the optical axis.

The third lens module 1230 may include a second lens seating portion 1210a on which a plurality of lenses are provided, and a second extending portion 1210b extending from the second lens seating portion 1210a. The second extending portion 1210b may extend from the other side of the second extending portion 1210b towards the second lens module 1220 opposing one side in the optical axis direction.

Accordingly, a length of one side of the third lens module 1230 may be shorter than a length of the other side opposing the one side. The length may refer to a length in the optical axis direction. Accordingly, the third lens module 1230 may have a shape in which one side and the other side are asymmetrical to each other with reference to the optical axis.

A direction in which the first extending portion 1220b of the second lens module 1220 extends may be opposite to a direction in which the second extending portion 1210b of the third lens module 1230 extends. Accordingly, the second and third lens modules 1220 and 1230 may have opposite shapes with reference to the optical axis direction.

The first extending portion 1220b of the second lens module 1220 may extend towards one side of the third lens module 1230, the side having a shorter length in the optical axis direction, and the second extending portion 1210b of the third lens module 1230 may extend towards the other side of the second lens module 1220, the side having a shorter length in the optical axis direction.

To implement an autofocusing adjustment and/or zoom function, the second lens module 1220 and the third lens module 1230 may move in the optical axis direction. Accordingly, it may be necessary to mount a magnet for providing a driving force to each of the second lens module 1220 and the third lens module 1230.

To reduce a size of the camera module, sizes of portions (the first and second lens seating portions 1220a and 1210a) of the lens module in which the plurality of lenses are provided may be reduced, but it may be difficult to reduce a size of the magnet to secure stable driving force. Accordingly, it may be difficult to reduce a size of a portion of each lens module on which the magnet is mounted.

The second lens module 1220 and the third lens module 1230 may be spaced apart from each other in the optical axis direction, but it may be difficult to reduce a size of a portion of each lens module on which a magnet is mounted. Accordingly, a gap between the first and second lens seating portions 1220a and 1210a may be unnecessarily increased such that it may be difficult to reduce a size of the camera module.

However, in the example embodiment, by configuring the second and third lens modules 1220 and 1230 to have opposite shapes with reference to the optical axis direction, and configuring a direction in which the first extending portion 1220b of the second lens module 1220 extends to be opposite to the direction in which the second extending portion 1210b of the third lens module 1230 extends, a gap between the first and second lens seating portions 1220a and 1210a may be reduced. Accordingly, a size of the camera module may be reduced.

The second lens module 1220 may include a first magnet 1243a in the first extending portion 1220b, and the third lens module 1230 may include a second magnet 1241a in the second extending portion 1210b.

As the first and second magnets 1243a and 1241a are disposed on a longer side surface of the side surfaces of the second and third lens modules 1220 and 1230, sizes of the first and second magnets 1243a and 1241a may be increased in a limited space. Accordingly, driving force may improve even when a size of the camera module is reduced.

Figure 7:
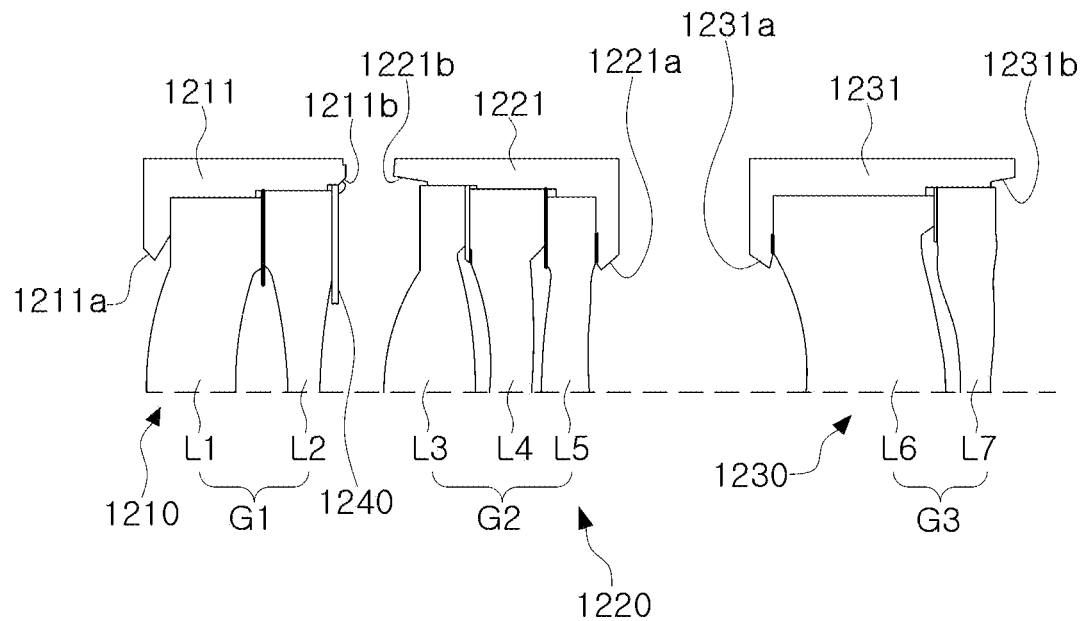
FIG. 7 is a cross-sectional view illustrating a lens module according to an example embodiment of the present disclosure.
Figure 8:
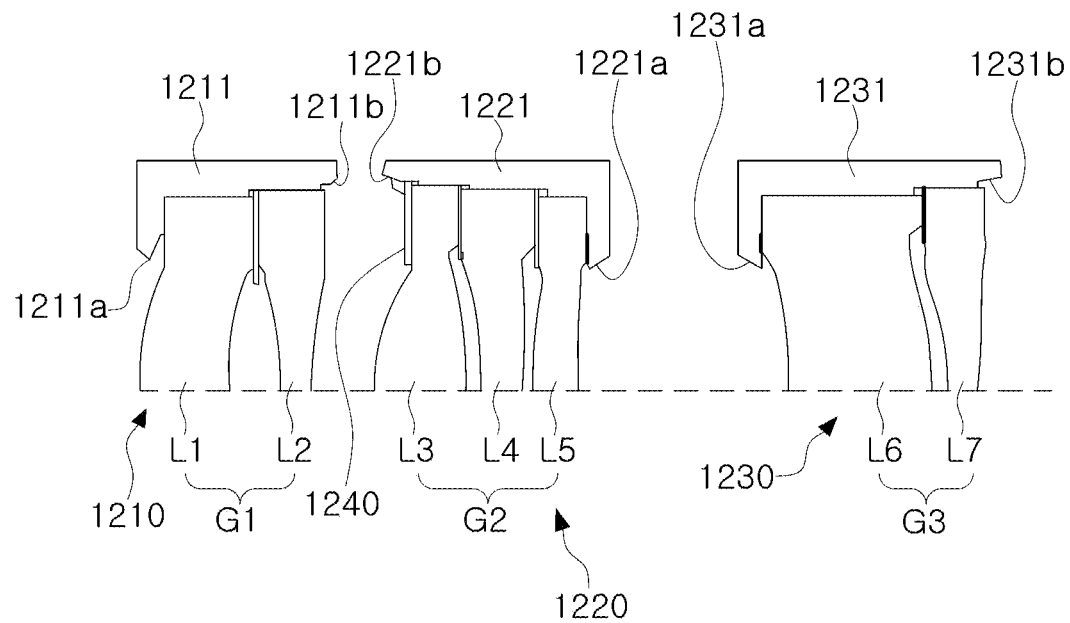
FIG. 8 is a cross-sectional view illustrating a lens module according to another example embodiment of the present disclosure.

FIG. 7 is a cross-sectional view illustrating a lens module according to an example embodiment. FIG. 8 is a cross-sectional view illustrating a lens module according to another example embodiment.

Referring to FIGS. 7 and 8, a first lens module 1210 may include a first lens barrel 1211 and a first lens group G1 accommodated in the first lens barrel 1211. The first lens group G1 may include two lenses.

A lens (hereinafter, referred to as a first lens L1) of the two lenses of the first lens group G1, disposed on a front side, may have positive refractive power, and a lens (hereinafter, referred to as a second lens L2) of the two lenses of the first lens group G1 disposed on a rear side may have negative refractive power. The first lens group G1 may be configured to have negative refractive power overall.

A second lens module 1220 may include a second lens barrel 1221, and a second lens group G2 accommodated in the second lens barrel 1221. The second lens group G2 may include three lenses.

A lens (hereinafter, referred to as a third lens L3) of the three lenses of the second lens group G2 disposed on the most front side may have positive refractive power, a lens (hereinafter, referred to as a fourth lens L4) disposed in the middle may have negative refractive power, and a lens (hereinafter, referred to as a fifth lens L5) disposed on the most rear side may have positive refractive power. The second lens group G2 may be configured to have positive refractive power overall.

The third lens module 1230 may include a third lens barrel 1231, and a third lens group G3 accommodated in the third lens barrel 1231. The third lens group G3 may include two lenses.

A lens (hereinafter, referred to as a sixth lens L6) of the two lenses of the third lens group G3 disposed on a front side may have positive refractive power, and a lens (hereinafter, referred to as a seventh lens L7) of the two lenses of the third lens group G3 disposed on a rear side may have negative refractive force. The third lens group G3 may be configured to have negative refractive power overall.

The first lens barrel 1211 may have an open front side and an open rear side such that light may pass therethrough. As an example, the first lens barrel 1211 may include a first through-hole 1211a on the front side, and may include a first opening 1211b on the rear side.

As the first lens group G1 is disposed in the first lens barrel 1211, it may be necessary to fasten a position of the first lens group G1 in the first lens barrel 1211. The first through-hole 1211a may be configured to enclose a portion of an object-side surface of the first lens L1, thereby fastening a position of the first lens group G1.

Accordingly, a diameter of the first through-hole 1211a may be less than a diameter of the first lens L1.

A diameter of the first opening 1211b may be the same as or greater than a diameter of the second lens L2. A diameter of the first opening 1211b may be greater than a diameter of the first through-hole 1211a.

The second lens barrel 1221 may have an open front side and an open rear side such that light may pass therethrough. As an example, the second lens barrel 1221 may include a second opening 1221b on the front side, and may include a second through-hole 1221a on the rear side.

As the second lens group G2 is disposed in the second lens barrel 1221, it may be necessary to fasten a position of the second lens group G2 in the second lens barrel 1221. The second through-hole 1221a may be configured to enclose a portion of an image-side surface of the fifth lens L5, thereby fastening a position of the second lens group G2.

Accordingly, a diameter of the second through-hole 1221a may be smaller than a diameter of the fifth lens L5.

A diameter of the second opening 1221b may be the same as or greater than a diameter of the third lens L3. A diameter of the second opening 1221b may be greater than a diameter of the second through-hole 1221a.

The third lens barrel 1231 may have an open front side and an open rear side such that light may pass therethrough. As an example, the third lens barrel 1231 may include a third through-hole 1231a on a front side, and may include a third opening 1231b on a rear side.

As the third lens group G3 is disposed in the third lens barrel 1231, it may be necessary to fasten a position of the third lens group G3 in the third lens barrel 1231. The third through-hole 1231a may be configured to enclose a portion of an object-side surface of the sixth lens L6, thereby fastening a position of the third lens group G3.

Accordingly, a diameter of the third through-hole 1231a may be less than a diameter of the sixth lens L6.

A diameter of the third opening 1231b may be the same as or greater than a diameter of the seventh lens L7. A diameter of the third opening 1231b may be greater than a diameter of the third through-hole 1231a.

The first opening 1211b of the first lens barrel 1211 and the second opening 1221b of the second lens barrel 1221 may be disposed to oppose each other. Also, the second through-hole 1221a of the second lens barrel 1221 and the third through-hole 1231a of the third lens barrel 1231 may be disposed to oppose each other.

When the second and third lens modules 1220 and 1230 move in the optical axis direction and are zoomed in, a gap between the first lens module 1210 and the second lens module 1220 may be less than a gap between the second lens module 1220 and the third lens module 1230.

Differently from the example illustrated in the view, when the first through-hole 1211a is formed on the rear side of the first lens barrel 1211 or the second through-hole 1221a is formed on the front side of the second lens barrel 1221, the first lens module 1210 and the second lens module 1220 may collide with each other when being zoomed in due to thicknesses of the lens barrels for forming the through-holes.

Accordingly, when being zoomed in, the first opening 1211b of the first lens barrel 1211 and the second opening 1221b of the second lens barrel 1221 may be configured to oppose each other to prevent the first lens module 1210 and the second lens module 1220 from colliding with each other.

Figure 6:
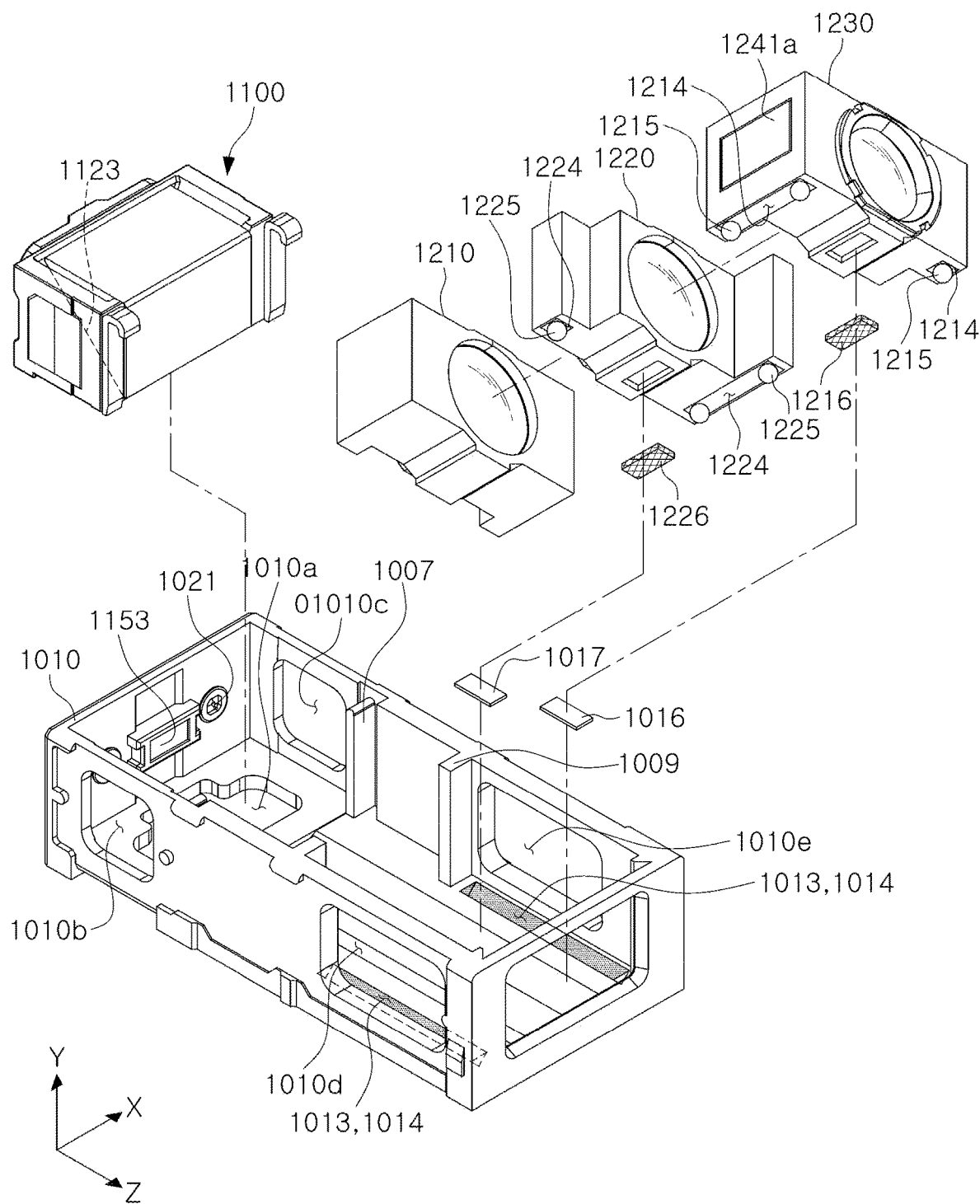
FIG. 6 is an exploded perspective view illustrating a housing and a lens module according to an example embodiment of the present disclosure.

A stopper 1009 may be disposed between the first lens module 1210 and the second lens module 1220 to prevent collision between the first lens module 1210 and the second lens module 1220 (see FIGS. 3, 5, and 6). In this case, also, when the first through-hole 1211a is disposed on a rear side of the first lens barrel 1211 or the second through-hole 1221a is disposed on a front side of the second lens barrel 1221, a gap between the first lens module 1210 and the second lens module 1220 may increase due to thicknesses of the lens barrels for forming the through-holes such that it may be difficult to decrease a size.

Accordingly, in the camera module in the example embodiment, the first opening 1211b of the first lens barrel 1211 and the second opening 1221b of the second lens barrel 1221 may oppose each other, thereby reducing a size of the camera module.

When the first opening 1211b of the first lens barrel 1211 and the second opening 1221b of the second lens barrel 1221 opposes each other, there may be no equipment for blocking unnecessary light, and unnecessary light may flow into a space between the first lens barrel 1211 and the second lens barrel 1221 such that a flare may occur.

Thus, in the camera module in the example embodiment, a light shielding member such as a cut-off film 1240 may be disposed in at least one of the first opening 1211b of the first lens barrel 1211 and the second opening 1221b of the second lens barrel 1221.

The cut-off film 1240 may be configured to cover at least one of the first opening 1211b and the second opening 1221b such that unnecessary light may be blocked. As an example, the cut-off film 1240 may be disposed on the first opening 1211b to cover a portion of the first opening 1211b, and may be disposed on the second opening 1221b to cover a portion of the second opening 1221b.

Further, a surface of the cut-off film 1240 may be surface-processed to scatter light. As an example, the surface of the cut-off film 1240 may be corroded and may have roughness. Also, a light absorbing layer may be provided on the surface of the cut-off film 1240 to block unnecessary light. The light absorbing layer may be configured as a black film or black iron oxide.

Instead of disposing a separate cut-off film, a portion of an upper side surface of the second lens L2 may be surface-processed, or a black light absorbing layer may be provided on a portion of the upper side surface of the second lens L2 as a cut-off film.

Also, a portion of an object-side surface of the third lens L3 may be surface-processed, or a black light absorbing layer may be provided on a portion of an object-side surface of the third lens L3 as a cut-off film.

Figure 9:
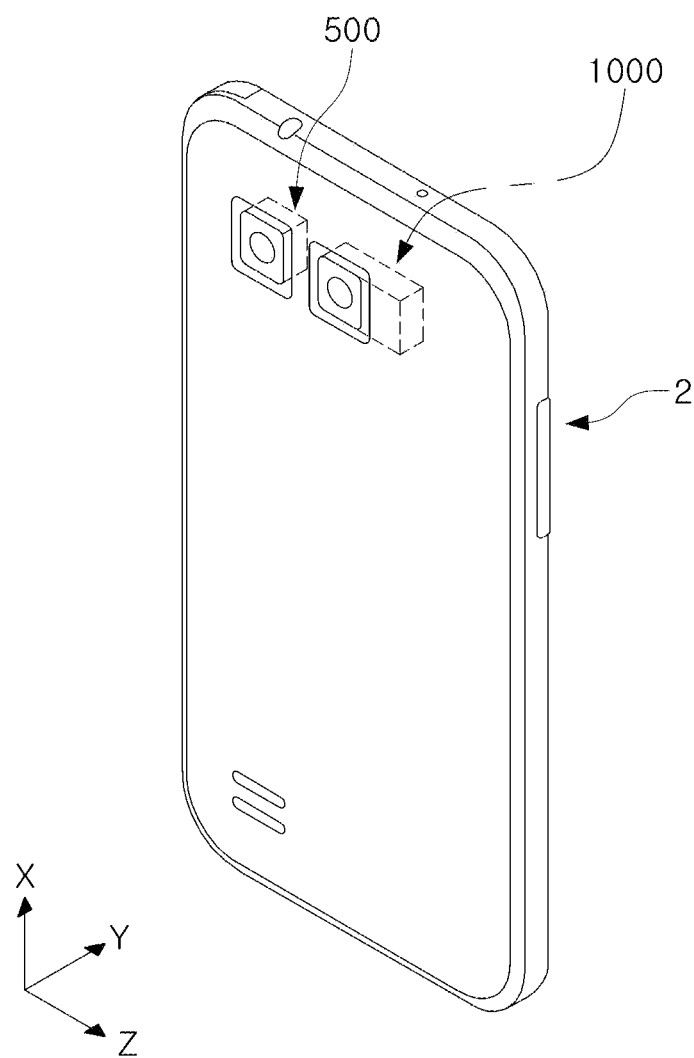
FIG. 9 is a perspective view illustrating a portable electronic device according to another example embodiment of the present disclosure.

FIG. 9 is a perspective view illustrating a portable electronic device according to another example embodiment.

Referring to FIG. 9, a portable electronic device 2 in another example embodiment may be implemented by a portable electronic device in which a plurality of camera modules 500 and 1000 are mounted, such as a mobile communications terminal device, a smartphone, a tablet PC, a wearable, or the like.

In the example embodiment, a first camera module 1000 and a second camera module 500 may be mounted on the portable electronic device 2.

The first camera module 1000 may be configured as the camera module 1000 described in the aforementioned example embodiments with reference to FIGS. 2 to 8.

In the case of a portable electronic device including a dual camera module, at least one of the two camera modules may be configured as the first camera module 1000 described in the aforementioned example embodiments.

The first camera module 1000 and the second camera module 500 may be configured to have different fields of view.

The first camera module 1000 may be configured to have a relatively narrow field of view (e.g., a telephoto), and the second camera module 500 may have a relatively wide field of view (e.g., a wide angle).

As an example, a field of view of the first camera module 1000 may be configured within a range of 10° to 25°, and a field of view of the second camera module 500 may be configured within a range of 75° to 85°.

By configuring the field of views of the two cameras differently, an image of a subject may be obtained with various depths.

According to the aforementioned example embodiments, a camera module that implements an optical zoom function, has a simplified structure and a reduced size, and may prevent a flare, may be provided.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a first lens module comprising a first lens barrel accommodating a first lens group; and
a second lens module spaced apart from the first lens module in an optical axis direction, configured to be moveable in the optical axis direction, and comprising a second lens barrel accommodating a second lens group,
a third lens module spaced apart from the second lens module in the optical axis direction, configured to be moveable in the optical axis direction, and comprising a third lens barrel accommodating a third lens group,
wherein the first lens barrel comprises a first through-hole on one side and a first opening on the other side,
wherein the second lens barrel comprises a second opening adjacent to the first opening on one side and a second through-hole on the other side,
wherein a diameter of the first opening is greater than a diameter of the first through-hole, and a diameter of the second opening is greater than a diameter of the second through-hole, and
wherein a light shielding member is disposed at an inner side of one or more the first opening and the second opening,
wherein the third lens barrel comprises a third through-hole opposing the second through-hole on one side and a third opening on the other side, and
wherein a diameter of the third opening is greater than a diameter of the third through-hole.

2. The camera module of claim 1, wherein the first lens group has negative refractive power, the second lens group has positive refractive power, and the third lens group has negative refractive power.

3. The camera module of claim 2,
wherein the first lens group comprises a first lens having positive refractive power and a second lens having negative refractive power,
wherein the second lens group comprises a third lens having positive refractive power, a fourth lens having negative refractive power, and a fifth lens having positive refractive power, and
wherein the third lens group comprises a sixth lens having positive refractive power and a seventh lens having negative refractive power.

4. The camera module of claim 1, wherein a gap between the first lens module and the second lens module is smaller than a gap between the second lens module and the third lens module.

5. The camera module of claim 1, further comprising:
a housing in which the first lens module, the second lens module and the third lens module are accommodated,
wherein the first lens module is fastened to and disposed in the housing, and
wherein a ball member is disposed between the second lens module and the housing and between the third lens module and the housing.

6. The camera module of claim 1, wherein one side surface and the other side surface of each of the second lens module and the third lens module have different lengths in the optical axis direction.

7. The camera module of claim 6,
wherein the first magnet is disposed on a side surface having a longer length between the one side surface and the other side surface of the second lens module, and the first coil is disposed in a position opposing the first magnet, and
wherein a second magnet is disposed on a side surface having a longer length between the one side surface and the other side surface of the third lens module, and a second coil is disposed in a position opposing the second magnet.

8. The camera module of claim 7, wherein the first magnet and the second magnet are disposed opposite to each other with reference to an optical axis.

9. A portable electronic device comprising:
a first camera;
an image sensor module configured to convert light which passes through the first and second lens modules into an electrical signal; and
a second camera module comprising a different field of view than the first camera module,
wherein the first camera module comprising:
a first lens module comprising a first lens barrel accommodating a first lens group; and
a second lens module spaced apart from the first lens module in an optical axis direction, configured to be moveable in the optical axis direction, and comprising a second lens barrel accommodating a second lens group,
wherein the first lens barrel comprises a first through-hole on one side and a first opening on the other side,
wherein the second lens barrel comprises a second opening opposing facing and adjacent to the first opening on one side and a second through-hole on the other side,
wherein a diameter of the first opening is greater than a diameter of the first through-hole, and a diameter of the second opening is greater than a diameter of the second through-hole, and
wherein a light shielding member is disposed at an inner side of one or more of the first opening and the second opening to cover a portion of one or more of the first opening and the second opening.

10. The portable electronic device of claim 9, wherein the first camera module comprises a narrower field of view than the second camera module.

11. The portable electronic device of claim 10, wherein the first camera module comprises a field of view within a range of 10° to 25° and the second camera module comprises a field of view within a range of 75° to 85°.

12. A portable electronic device comprising:
a first camera module comprising the camera module of claim 1;
an image sensor module configured to convert light which passes through the lenses into an electrical signal; and
a second camera module comprising a different field of view than the first camera module.

* * * * *